Aug. 11, 1959     F. C. DE LA FLOR     2,899,239
DEMOUNTABLE RIM FOR VEHICLE TIRES
Filed Sept. 30, 1957     2 Sheets-Sheet 1
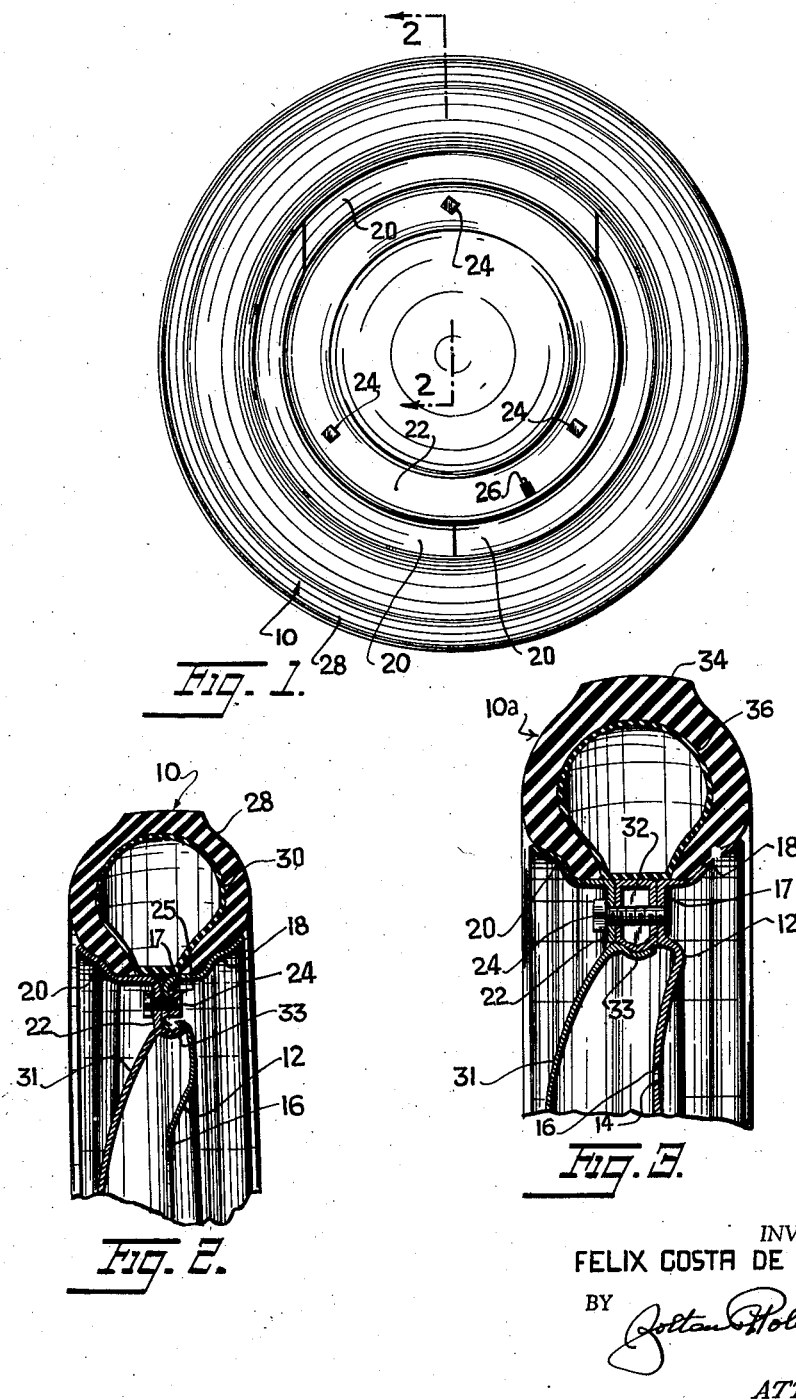
INVENTOR.
FELIX COSTA DE LA FLOR
BY
ATTORNEY

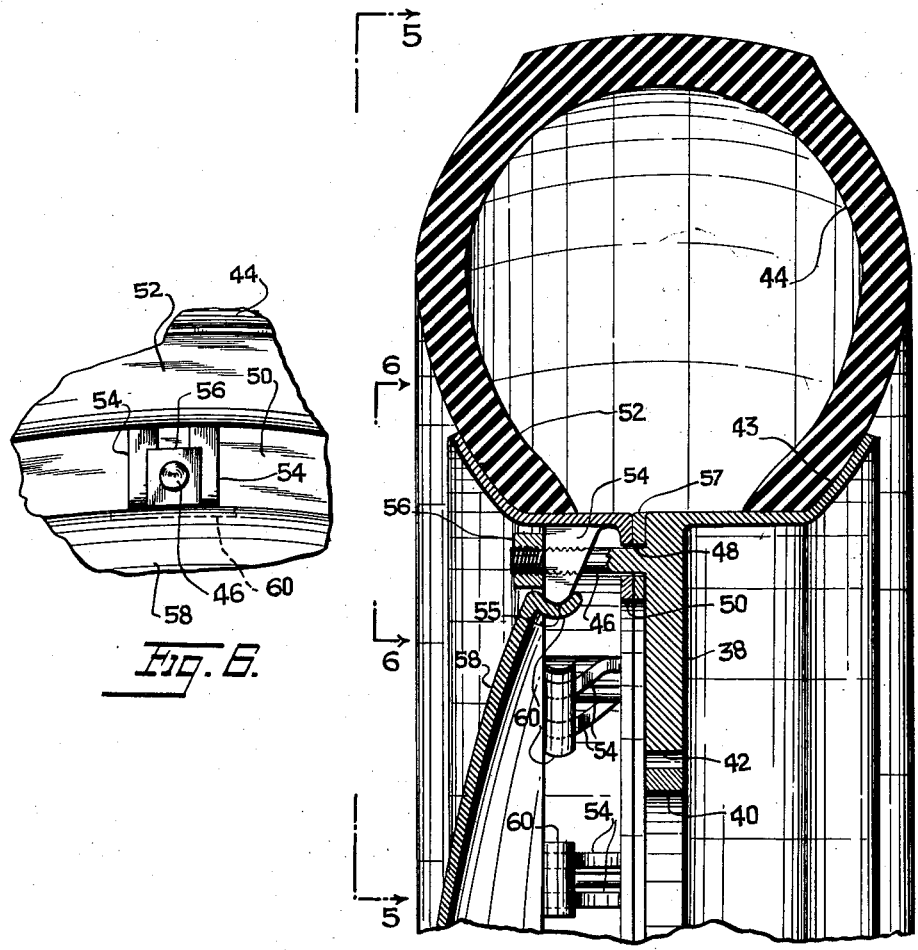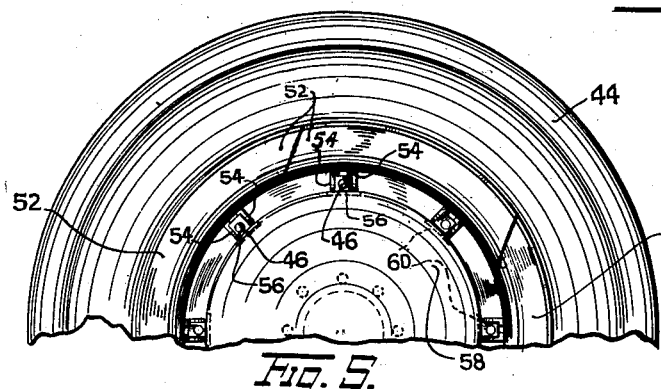

United States Patent Office 2,899,239
Patented Aug. 11, 1959

2,899,239

DEMOUNTABLE RIM FOR VEHICLE TIRES

Felix Costa de la Flor, Havana, Cuba

Application September 30, 1957, Serial No. 687,197

1 Claim. (Cl. 301—31)

This invention relates to vehicle wheels having pneumatic tires, and more particularly has reference to a wheel having a demountable rim.

The main object of the present invention is to provide a generally improved demountable rim, which can be used to advantage in facilitating the mounting or demounting of the tires.

Another object is to provide a demountable rim as stated which will be particularly designed to permit the main portion of the rim and the removable portions to be adjustably spaced apart, to receive tires of different widths.

Another object is to form the demountable rim in a manner such that it will comprise a plurality of sections each extending a prescribed number of degrees through the circumference of the wheel, for removal or replacement of any section without affecting the remaining sections.

Another object is to form the demountable rim in a manner such that a hub cap will be connectable to the demountable rim in a novel arrangement.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is an elevational view of the tire and wheel according to the invention.

Fig. 2 is a sectional view substantially on line 2—2 of Fig. 1.

Fig. 3 is a view like Fig. 2 showing a modification.

Fig. 4 is an enlarged sectional view similar to Fig. 2 showing a second modification.

Fig. 5 is a fragmentary elevational view on a scale reduced below that of Fig. 4, of the modified tire as seen from the line 5—5 of Fig. 4.

Fig. 6 is a fragmentary front elevational view, on the same scale as Fig. 4, of the modified wheel as seen from the line 6—6 of Fig. 4.

Referring to the drawings in detail, in Figs. 1 and 2 the wheel 10 includes a main rim body 12 which may be of pressed steel or the like, having the usual axle-receiving center opening 14 about which lug-receiving openings or apertures 16 are angularly spaced.

The center portion of the body 12 is of concavo-convex formation, with its convex surface faced to the outside of the wheel as shown in Fig. 2. At the rim of the concavo-convex portion, there is provided a marginal portion 17 which is of planiform formation, and lies in the plane of the center portion of the rim body in which the opening 14 is formed.

On the outer periphery of the flat marginal portion 17 there is provided a rim flange 18, shaped to include half of a drop center rim as seen from Fig. 2.

Removable, arcuate rim sections 20 are formed as complementary rim flanges at their outer peripheries, and at their inner peripheries have flat portions 22 adapted to extend in face-to-face contact with the portion 17. The rim sections 20 are three in number as will be seen from Fig. 1, each extending through 120° of a circle, the several sections being in end-abutting relation.

Medially between the opposite ends of each rim section there is formed an opening receiving a lug or bolt 24. The bolt 24 is adapted to be threadedly engaged in a nut 25 welded to the back of the flat marginal portion 17 of the rim body 12.

Designated at 26 is the usual valve, which will extend through an opening provided in one of the flanges 20.

A conventional tire has been designated at 28, including the usual casing and inner tube 30. In use, the tire and casing are put upon the main rim body, after which the several sections 20 are positioned as shown in Fig. 1, and the lugs 24 are threaded into nuts 25 to fixedly connect the sections to the main body. A hub cap 31, having angularly spaced tongues 33, is then snapped into a depressed marginal part of rim body 12, defined by the provision of the planiform marginal portion 17 on the periphery of the concavo-convex center part of the main rim body.

To this end, the periphery of the concavo-convex portion may be formed with an overhang adapted to engage the spring tongues 33 of the hub cap.

Referring to Fig. 3, there is here shown an arrangement in which the rim body 12 and the rim sections 20, unchanged from the construction illustrated in Figs. 1 and 2, can be employed in accommodating a wider tire for wheel 10ª than that shown in Figs. 1 and 2. Thus, in this arrangement a spacer 32 of tubular formation extends through the full circumference of the rim body, in overlying relation to the planiform marginal portion 17. The spacer 32 of annular formation is endless, and is interposed between the portions 17, 22 as seen in Fig. 3. The spacer has openings receiving the bolts 24 and thus it is seen that when the spacer is employed, the rim flanges 18, 20 are spaced a greater distance apart so as to accommodate a wider tire casing 34 having the tube 36. The hub cap 31 is applied in the same manner as in the first form, except that the inner periphery of spacer 32 has a continuous corrugation defining the overhang engageable with the spring tongues 33.

In Figs. 4–6 there is shown a modified construction. In this form, the rim body 38 is of planiform formation fully to its outer periphery and has a center opening 40 for receiving the spindle of the axle, lug-receiving openings 42 being angularly spaced about the opening 40.

Integrally formed upon the periphery of body 38 is a rim flange 43 adapted to receive one side of a tire casing 44. In the illustrated example a tubeless tire is shown, and it will be noted that the demountable rim of the invention is adapted to receive, in at least this form of the invention, tubeless as well as tube-provided tires.

Angularly spaced uniformly about the margin of body 38 are integral, forwardly projecting studs 46, adapted to extend through openings 48 of demountable rim sections 50 which cooperate in defining a rim member, in the same manner that the sections 20 of the first form cooperate to define a continuous, annular, removable rim member. In this form of the invention, there are four sections 50, rather than three, but this number can, of course, be varied if desired.

In any event, each rim section 50 has a rim flange 52 complementary to the flange 43. Flange 52 projects forwardly from the periphery of the planiform main portion of the demountable rim section 50 as seen from Fig. 4.

Cast or otherwise rigidly formed upon the undersides of the flanges 52 are pairs of approximately triangular lugs 54 having rounded outer or apex portions 55 (Fig. 4). The lugs of each pair have front surfaces in a common plane parallel to the plane of the rim body 38, with each stud 46 extending between the lugs 54 of a pair.

Assuming that a tire is to be mounted on the wheel, a continuous, flat, sealing gasket 57 of rubber or other resiliently compressible material is positioned upon the marginal area of rim body 38, and has openings receiving the several studs 46. The tire 44 is placed upon the flange 43. Then, the several rim sections 50 are positioned upon the several studs 46. The studs will now extend through the space between the lugs 54 of each pair of lugs. Then, nuts 56 are applied to the forwardly projecting ends of the studs. The nuts 56 are turned so as to draw the sections 50 in a direction axially of the wheel, that is, to the right in Fig. 4, to compress gasket 57 and firmly seat both side walls of tire 44 upon the rim flanges 43, 52.

Then, a hub cap 58, having angularly spaced, circumferentially extending, transversely indented spring tongues 60, is applied. The tongues 60 have their concave surfaces faced radially outwardly of the hub cap, in position to be cammingly engaged by the rounded ends 55 of the lugs 54. Each tongue 60 is of a length to be engaged by both lugs 54 of a pair. The hub cap thus snaps into place, but can be readily detached when necessary merely by inserting the hand between the periphery of the hub cap and the rim flange 52, as will be readily noted from Figs. 5 and 6.

In both forms of the invention there is the common characteristic wherein the device can be made at a very low cost, and can be adapted to receive tires of different widths without requiring modification of the rim body or the demountable rim section. Thus, the spacer shown in Fig. 3 could, of course, be employed between the sections 50 and the marginal part of the rim body 38, in the form of the invention shown in Fig. 4. Further, in both forms of the invention, the hub cap is adapted to snap onto the wheel with ease, and will be held firmly in place when so attached.

While I have illustrated and described the preferred embodiments of my invention, it is to be understood that I do not limit myself to the precise constructions herein disclosed and that various changes and modifications may be made within the scope of the invention as defined in the appended claim.

Having thus described my invention, what I claim as new, and desire to secure by United States Letters Patent is:

In a vehicle wheel, a demountable rim including a generally circular body formed with a rim flange, a plurality of arcuate rim sections cooperating to form a continuous, annular rim member, said sections including rim flanges complementary to that of said body, and means for detachably connecting the several rim sections to the body, said body and rim sections having planiform portions in face-to-face contact at the location of the connections of the sections to the body, said connecting means comprising studs rigid with and projecting forwardly from the body in positions angularly spaced circumferentially of the body, lugs on the rim sections adjacent the studs, and nuts threadable on the studs and bearing against the lugs to force the rim sections toward said body, said lugs being arranged in pairs with each stud extending between the lugs of a pair, each nut bearing against both lugs of a pair, said lugs projecting radially inwardly from the rim flanges of the sections, said wheel further including a hub cap engageable with the lugs, said hub cap including angularly spaced tongues each of which engages a pair of lugs, the lugs having on their inner ends cam surfaces biasing the tongues inwardly on mounting of the hub cap and adapted to extend as overhangs holding the tongues after biasing the same inwardly, thus to maintain the hub cap in position upon the wheel.

References Cited in the file of this patent

UNITED STATES PATENTS

| | | |
|---|---|---|
| 1,672,696 | Smith | June 5, 1928 |
| 2,019,145 | Le Jeune | Oct. 29, 1935 |
| 2,242,425 | Ferro | May 20, 1941 |
| 2,805,892 | Sardella | Sept. 10, 1957 |